INVENTOR
ALBERT E. WORTHINGTON

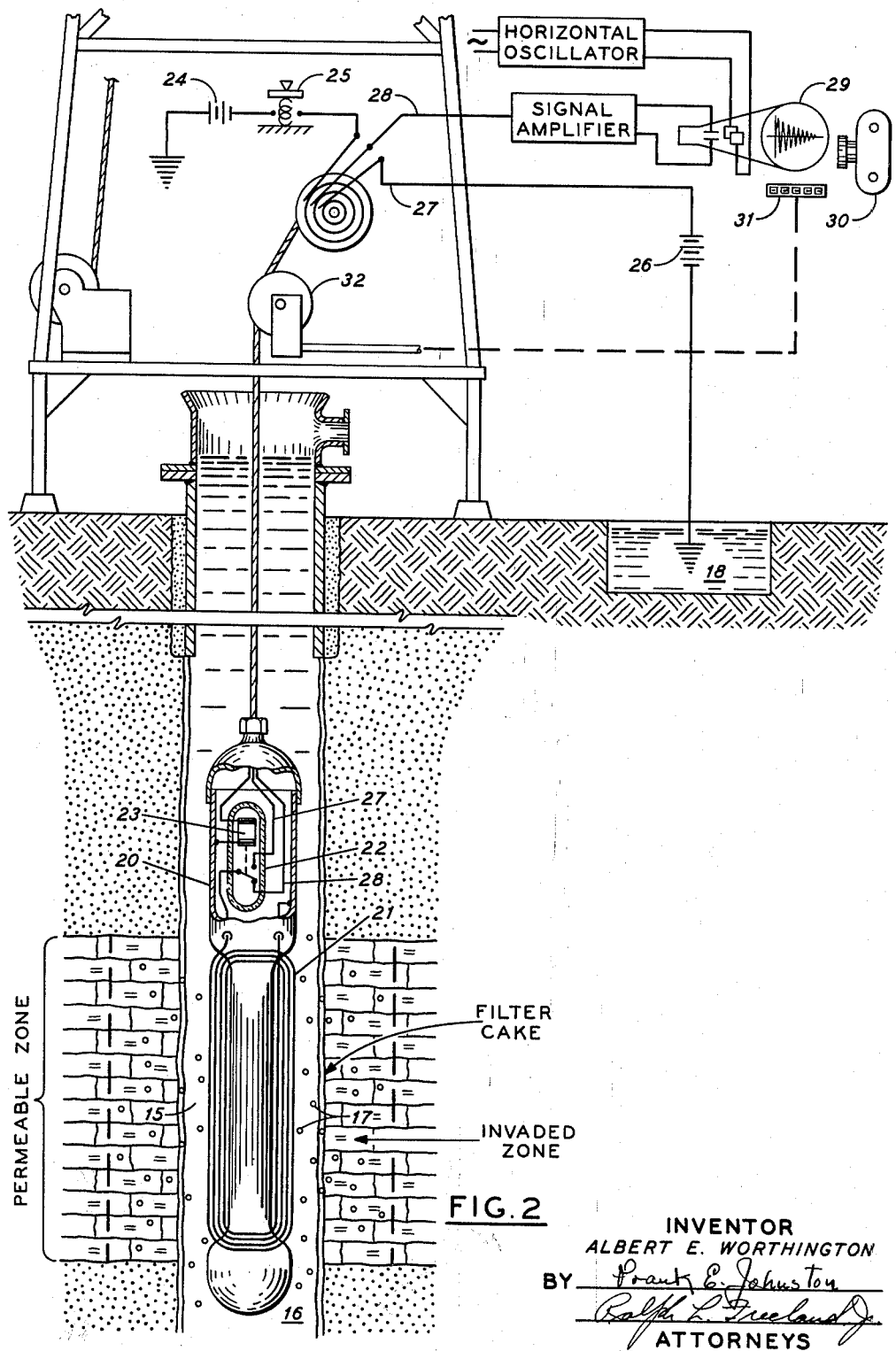

United States Patent Office 3,188,556
Patented June 8, 1965

3,188,556
NUCLEAR MAGNETIC LOGGING METHOD
Albert E. Worthington, Fullerton, Calif., assignor to California Research Corporation, San Francisco, Calif., a corporation of Delaware
Filed Mar. 4, 1955, Ser. No. 492,293
9 Claims. (Cl. 324—.5)

This invention relates to an improved method of nuclear magnetic well logging, more particularly to a method of selectively changing the relaxation time of nuclear magnetic signals derived from protons within fluids in and around the well bore by the introduction of a paramagnetic material in molecular form which is soluble in one phase of a drilling fluid, and it has for an object the provision of an improved method of distinguishing whether the protons within fluids in and around a well bore are contained in water or in hydrocarbons by introduction of a paramagnetic material in molecular form such as molecular oxygen which is soluble in water and substantially insoluble in hydrocarbons so that water and oil may be distinguished even when the physical environment of temperature and pressure would normally cause the protons within these fluids to have substantially the same relaxation times.

FIG. 2 illustrates a nuclear magnetism logging system operating in the well drilled in the manner of FIG. 1.

Figure 1:
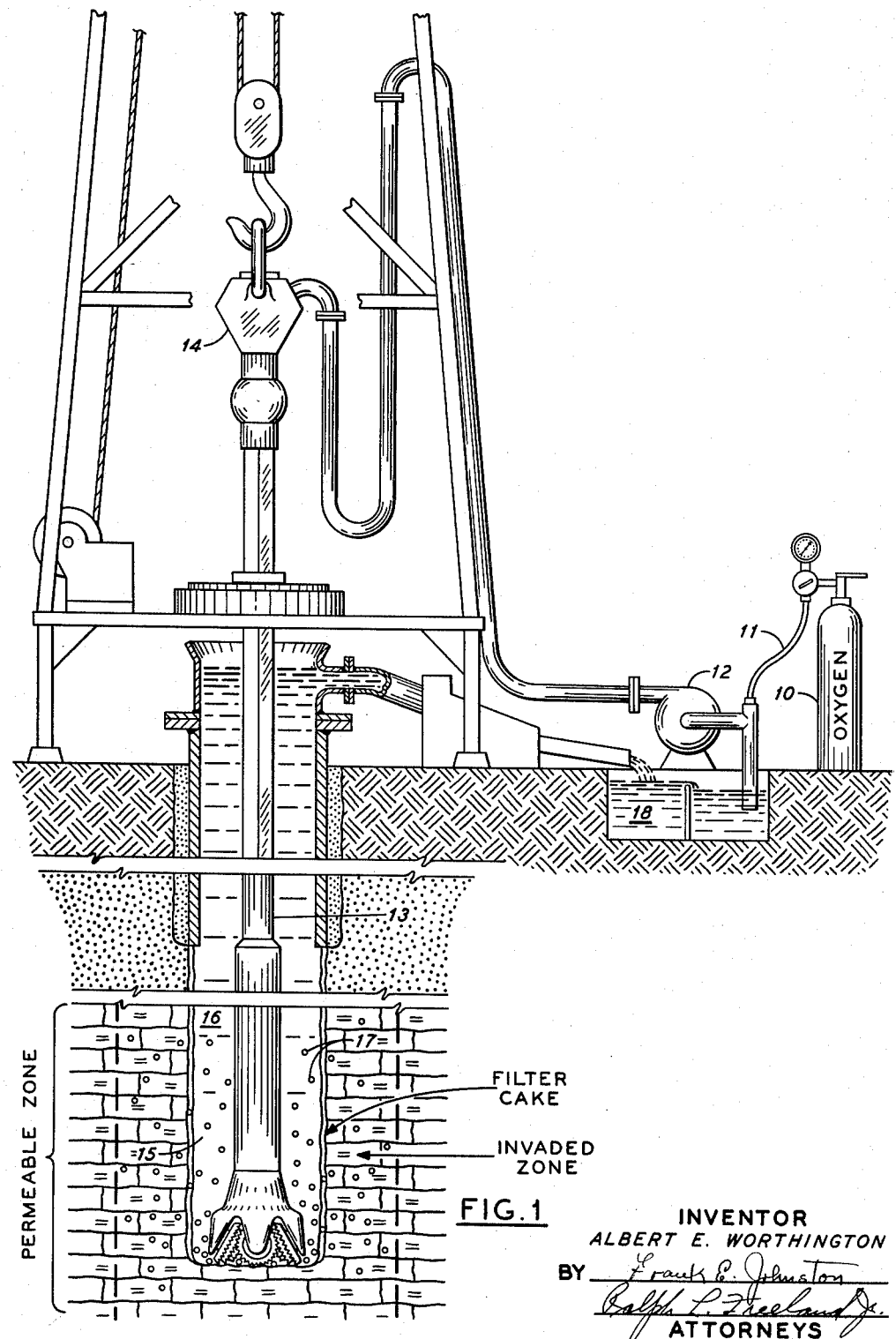
FIG. 1 is a schematic, vertical sectional view of a drilling rig and a part of an earth formation representing one manner in which molecular paramagnetic material may be introduced into drilling fluid during the drilling of the well bore.

In the logging of nuclear magnetic relaxation times of protons within fluids in and around a well bore, as in FIG. 2, there is normally established a nuclear magnetic field by positioning a field inducing coil 21 within the well bore 15. A D.C. current supplied by battery 26 and line 27 through vacuum switch 22 is then passed through coil 21 for a brief period of time, as controlled by the depression of switch 25 which supplies current to relay 23 of vacuum switch 22 from battery 24. The nuclear magnetic moments of the protons are oriented in the direction of the magnetic field created by the D.C. current in coil 21. When this relatively strong field is interrupted, by release of switch 25 and deactivation of relay 23 protons contained in the fluids surrounding the well bore and within the well bore precess in unison about the earth's relatively weak magnetic field or any other suitable secondary field. This in phase precession of protons is detected through the lower contact of relay 23 and line 28 which supplies the signal to a signal amplifier so that it can be displayed on an oscilloscope 29 and, if desired, photographed by camera 30 in accordance with the depth of the logging instrument in the well bore, as detected by cable-length measuring device 32 and indicator 31. The time required for the protons to cease precessing in unison or to become randomized in their orientations after termination of the induced field is referred to in the art as the relaxation time. The characteristic signal is indicated on the face of the oscilloscope 29. The relaxation time for protons in a liquid is very sensitive to the mechanical viscosity of the fluid. Thus, under surface conditions of temperature and pressure, the relaxation time of protons in water is quite long as compared to those contained in hydrocarbons, such as oil. Under downhole conditions, on the other hand, where the pressure and temperatures are both quite high and where crude oil may contain very large amounts of dissolved methane, and thus have an abnormally low viscosity, the relaxation times for protons in water and hydrocarbon may be distinguished only with great difficulty. Accordingly, it is desirable to be able to change the relaxation time for the protons in one or the other of these fluids in order to permit distinction between them by a nuclear magnetic logging system.

It has been proposed heretofore to introduce water soluble paramagnetic ions into the drilling fluid in order to modify the signal obtained from the drilling fluid in well bore 15 and the drilling fluid filtrate that may invade the formations adjacent the bore hole. (Indicated in FIGS. 1 and 2 as the invaded zone, and designated generally as the portion between the filter cake on well bore 15 and the dashed lines.) The physical characteristics and particularly the fluid properties of the drilling fluid are very sensitive to the kind and concentration of ions in the liquid phase. Additionally, the introduction of such permamagnetic ions, for example, iron, cobalt, nickel, copper, and the like, have a tendency to adversely affect the electrical properties of the drilling fluid so that the normal electrical logging of the well bore is made quite difficult, if not impossible.

In accordance with a preferred method of carrying out the present invention, and as best illustrated by FIG. 1, it has been found possible to modify the relaxation times of the protons within the fluids in and around the well bore without adversely affecting the physical and electrical properties of the drilling fluid by introducing a molecular paramagnetic material, such as molecular oxygen into the well bore fluid. As seen in FIG. 1, a tank of oxygen 10 may be bled through a line 11 into the intake line of a pump 12 which supplies drilling fluid 16 to the conventional swivel 14 and drill string 13 so that it may be mixed and dispersed within the drilling fluid during the drilling of the well. The presence of oxygen in the drilling mud is indicated by the bubbles 17 which, of course, will not exist as gaseous particles and are indicated merely to designate the presence of such molecular oxygen in both the drilling mud and in the filtrate that has created the invaded zone within the oil zone as there shown. Desirably, the molecular paramagnetic material is preferentially soluble in one or the other of the two liquids to be distinguished, oil and water. In the case of molecular oxygen, this paramagnetic material is selectively soluble in water. The molecular oxygen in accordance with the invention may be introduced either directly into the well fluid as a pure gas, or in a gaseous or liquid mixture with inert materials, such as air, or may be introduced by a compound such as hydrogen peroxide which is capable of liberating molecular oxygen.

In carrying out the method of the present invention, it is possible to introduce the molecular paramagnetic material into the drilling fluid for the purpose of modifying the relaxation time of protons contained in the drilling fluid water during some or all of the time the well is being drilled. In this way, the molecular paramagnetic material is dissolved in the water of the drilling fluid and is able to penetrate through the filter cake and even invade the porous formations lying along the well bore, particularly those permeable formations containing water in an unbound or free state. Once the fluid containing the dissolved molecular paramagnetic material has passed through the filter cake and invaded the permeable formations adjacent to the well bore, that molecular paramagnetic material is free to diffuse throughout any fluid forming a continuous phase with the invading fluid and thus to influence the nuclear magnetic relaxation time of all protons contained in that fluid phase, regardless of whether said protons were originally present in the formation or were introduced during the act of drilling the bore hole.

Alternatively, the modification of the nuclear magnetic relaxation time of the protons in the drilling fluid may be affected by introduction of the molecular paramagnetic material into the drilling fluid after completion of the drilling operation. Particular portions of the well bore fluids may thus be selectively treated in accordance with the invention by the introduction of the molecular paramagnetic material through the drill string 13, while it is being removed from bore hole 15 and prior to the logging operation, as illustrated in FIG. 2.

The actual manner of introducing the molecular paramagnetic material is immaterial to the present invention. It may be accomplished while the drilling mud is at essentially atmospheric pressure by introduction into the surface circulating and storing facilities normally associated with the drilling operation. For example, oxygen from tank 10 could be bled directly into the mud pit 18. It may also be injected under pressure into the drilling fluid stream as the fluid passes from pump 12 and immediately prior to its entry into the drill pipe, as particularly illustrated in FIG. 1. This latter method is particularly advantageous where the molecular paramagnetic material is a gaseous material. In this way, not only the bulk volume of molecular paramagnetic material to be handled at the well site is reduced by compression of the gaseous material, but also the solubility, and thus the effective concentration, is increased by injection into the fluid at high pressure.

In the practice of this invention, molecular oxygen is a very suitable molecular paramagnetic material. It is readily available at a reasonable cost in various forms, such as atmospheric air, compressed air, and compressed or liquid oxygen. It may also be supplied in a chemically bound form by materials such as hydrogen peroxide, which although not paramagnetic itself can be readily induced to decompose to form molecular oxygen in drilling fluid, after injection. Thus, whatever the form and nature of the molecular paramagnetic material selected for the practice of this invention, the only requirement, other than paramagnetism, is that the material does not adversely affect the electrical and fluid properties of the drilling fluid. Thus, slightly ionized paramagnetic materials may be used as effectively as undissociated molecular paramagnetic material, provided the degree of ionization is slight enough so as not to affect adversely the aforementioned electrical and fluid properties of the drilling fluid.

In the foregoing description of the preferred method of carrying out the present invention, only water soluble molecular paramagnetic materials have been specified as the desired paramagnetic material. However, other molecular paramagnetic materials may be employed, which are preferentially soluble in hydrocarbons rather than in water. The use of such materials may be particularly desirable when the well bore is filled with oil, oil-in-water emulsion, or water-in-oil emulsion. With such hydrocarbon soluble materials, it is possible to change the relaxation time of protons contained in the hydrocarbons encountered along the well bore, rather than the relaxation time of the protons in water, either in the drilling fluid or contained in formations traversed by the well bore. Accordingly, it will be understood that the molecular paramagnetic material suitable for the attendant relaxation time modification will satisfy requirements of the invention where it is capable of performing the prescribed function without serious modification of the drilling fluid.

In performing the method of the present invention, it will be apparent that after the well fluids are treated by the introduction into the drilling fluid of the relaxation time modifying agent, desirably molecular oxygen, as in FIG. 1, the nuclear magnetic logging run will be performed, as in FIG. 2, which includes the steps of including a nuclear magnetic field, through use of coil 21 within and surrounding the well bore, then periodically interrupting the induced field by actuation of switch 25 and measuring the time for relaxation of the protons within the induced field after each interruption with said measuring times being recorded through oscilloscope 29 in accordance with a depth of the induced field in the well bore.

Various modifications and changes in the method described hereinabove may be made without departing from the invention. All such modifications and changes falling within the scope of the appended claims are intended to be included therein.

I claim:

1. A method of changing the relaxation time of nuclear magnetic signals from protons within one of the fluids in and around a well bore which comprises adding a paramagnetic material that is molecularly soluble in said one fluid to the well bore fluids in an amount sufficient to reduce measurably the nuclear magnetic relaxation time of protons in said well bore fluids and then introducing said well bore fluids into said well bore under sufficient pressure whereby said molecularly soluble paramagnetic material will penetrate the filter cake formed by said well bore fluids to change the relaxation time of said nuclear magnetic signal from said one fluid in and around that portion of the well bore wherein said molecularly soluble paramagnetic material has been introduced.

2. A method in accordance with claim 1 in which said molecular paramagnetic material is introduced directly into said well bore fluid as a physical mixture containing said material.

3. A method in accordance with claim 1 in which said molecular paramagnetic material is introduced as a chemical compound capable of reacting with said one fluid of said well bore fluids to liberate said material after introduction into the well bore.

4. A method in accordance with claim 1 in which the molecular paramagnetic material is molecular oxygen.

5. A method in accordance with claim 1 wherein said molecular paramagnetic material is introduced into said well bore fluid while said fluid is at essentially atmospheric pressure.

6. A method in accordance with claim 1 wherein said well bore fluid is circulated into and out of said well bore by drilling fluid pumps and said molecular paramagnetic material is injected at high pressure into the output of said drilling fluid pumps and immediately prior to circulation of said fluid down the bore hole.

7. A method of altering the nuclear magnetic relaxation times of protons in liquids within and around a well bore without modification of the electrical or physical properties of said liquids which comprises the steps of adding to a liquid phase within liquids of the drilling fluid in said well bore a soluble paramagnetic material in molecular form in an amount sufficient to reduce measurably the nuclear magnetic relaxation time of protons in said liquids of said drilling fluid and introducing said modified drilling fluid into the well bore to modify the relaxation times of protons within liquids of the same phase as that in which said paramagnetic material is soluble and to permit distinction between the relaxation times of protons in said same liquid phase from those in a different liquid phase.

8. In the method of nuclear magnetic logging of the fluid content of earth formations traversed by a well bore having therein an aqueous drilling fluid opposite the formations of interest, which method comprises traversing the well bore with a nuclear magnetic logging circuit, inducing a magnetic field at selected locations within a predetermined length of the well bore, periodically interrupting said field, after each interruption measuring the nuclear magnetic relaxation times of the protons exposed to said field and recording each of the time measurements in accordance with the depth of said field in the well bore, the improvement of selectively changing the relaxation times of nuclear magnetic signals derived from protons within one of the plurality of said fluids without adversely affecting the physical and electrical properties of the aqueous drilling fluid in the well bore, which improvement comprises introducing into said drilling fluid a molecular paramagnetic material which is preferentially soluble, as compared to oil, in the aqueous phase of the drilling fluid and in an amount sufficient to reduce measurably the nuclear relaxation time of protons in said aqueous phase of the drilling fluid.

9. In the method of nuclear magnetic logging, the content of oil and water in earth formations traversed by a well bore having therein an aqueous drilling fluid opposite the formations of interest, which method comprises traversing the well bore with a nuclear magnetic logging circuit inducing a magnetic field at selected locations within a predetermined length of the well bore, periodically interrupting said field, after each interruption measuring the nuclear magnetic relaxation times of the protons exposed to said field and recording each of the time measurements in accordance with the depth of said field in the well bore, the improvement of selectively changing the relaxation time of the nuclear magnetic signals derived from protons within the liquid phases exposed to said magnetic field which improvement comprises introducing into said drilling fluid molecular paramagnetic material which is preferentially soluble in water as compared to oil and in an amount sufficient to reduce measurably the nuclear magnetic relaxation time of protons in said aqueous phase.

References Cited by the Examiner

UNITED STATES PATENTS

| | | | |
|---|---|---|---|
| Re. 23,950 | 2/55 | Bloch et al. | 324—0.5 |
| 2,401,280 | 5/46 | Walstrom | 324—8 |

OTHER REFERENCES

Bloch et al.: Physical Review, vol. 70, No. 7, Oct. 1, 1946, pp. 474–485.

Hahn: Physical Review, vol. 77, No. 2, Jan. 15, 1950, pp. 297, 298.

Gabillard et al.: Academie Des Sciences Comptes Rendus, vol. 233, pages 480–482, August 1951.

Hahn: Physical Review, vol. 80, No. 4, Nov. 15, 1950, pages 580–593 (page 586 relied upon).

Anderson: Physical Review, vol. 76, No. 10, November 1949, pages 1460–1470 incl.

CHESTER L. JUSTUS, *Primary Examiner.*

NOMAN H. EVANS, MAYNARD R. WILBUR,
*Examiners.*

UNITED STATES PATENT OFFICE
CERTIFICATE OF CORRECTION

Patent No. 3,188,556                                  June 8, 1965

Albert E. Worthington

It is hereby certified that error appears in the above numbered patent requiring correction and that the said Letters Patent should read as corrected below.

Column 2, line 15, for "permamagnetic" read -- paramagnetic --; column 3, lines 69 and 70, for "including" read -- inducing --; column 5, line 4, after "nuclear" insert -- magnetic --.

Signed and sealed this 21st day of December 1965.

(SEAL)
Attest:

ERNEST W. SWIDER                              EDWARD J. BRENNER
Attesting Officer                                  Commissioner of Patents